United States Patent
Mergenthaler et al.

(10) Patent No.: US 6,542,805 B1
(45) Date of Patent: Apr. 1, 2003

(54) DEVICE AND METHOD FOR CONTROLLING AT LEAST ONE VARIABLE OF VEHICLE MOVEMENT

(75) Inventors: Rolf-Hermann Mergenthaler, Leonberg (DE); Ansgar Traechtler, Ditzingen-Hirschlanden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,948
(22) PCT Filed: Sep. 13, 2000
(86) PCT No.: PCT/DE00/03183
§ 371 (c)(1), (2), (4) Date: Oct. 11, 2001
(87) PCT Pub. No.: WO01/26943
PCT Pub. Date: Apr. 19, 2001

(30) Foreign Application Priority Data

Oct. 12, 1999 (DE) .......................................... 199 49 286

(51) Int. Cl.⁷ ................................................. B60T 7/12
(52) U.S. Cl. ......................... 701/82; 701/116; 701/122; 340/438; 340/439; 340/459
(58) Field of Search ................................ 701/1, 82, 94, 701/116, 122; 340/436, 438, 439, 440, 459

(56) References Cited

U.S. PATENT DOCUMENTS

| | | | | |
|---|---|---|---|---|
| 4,673,194 A | * | 6/1987 | Sugasawa | 280/5.519 |
| 5,303,155 A | * | 4/1994 | Kallenbach et al. | 701/37 |
| 5,636,121 A | | 6/1997 | Yoshida et al. | |
| 6,209,887 B1 | * | 4/2001 | Kyrtsos | 280/5.515 |

FOREIGN PATENT DOCUMENTS

| | | |
|---|---|---|
| DE | 39 33 652 | 4/1991 |
| DE | 195 44 445 | 6/1997 |
| DE | 196 02 170 | 7/1997 |

OTHER PUBLICATIONS

*FDR—Die Fahrdynamikregelung von Bosch* (FDR—vehicle dynamics control), Automobiltechnische Zeitschrift (ATZ), 96, 1994, vol. 11, pp. 674 to 689.

* cited by examiner

*Primary Examiner*—Gertrude Arthur
(74) *Attorney, Agent, or Firm*—Kenyon & Kenyon (57) ABSTRACT

A device for controlling at least one vehicle motion quantity which describes a motion of a vehicle is presented. For this purpose, the device contains a control arrangement for activating actuators to control the vehicle motion quantity. The device also contains a determining arrangement for determining a poor road stretch quantity which describes the travel of the vehicle on a poor road stretch. The control arrangement is affected as a function of the poor road stretch quantity so that the sensitivity of the control arrangement is adapted to the travel of the vehicle on a poor road stretch.

16 Claims, 3 Drawing Sheets

DEVICE AND METHOD FOR CONTROLLING AT LEAST ONE VARIABLE OF VEHICLE MOVEMENT

FIELD OF THE INVENTION

The present invention relates to a device and a method for controlling at least one vehicle motion quantity which describes a motion of a vehicle.

BACKGROUND INFORMATION

A device for controlling at least one vehicle motion quantity is described in an article published in the journal Automobiltechnische Zeitschrift (ATZ), 96, 1994, Vol. 11, pp. 674 to 689 "FDR—Die Fahrdynamikregelung von Bosch" (FDR—vehicle dynamics control by Bosch). The vehicle motion quantity here is the yaw rate of the vehicle. In order to control the vehicle's yaw rate, the measured yaw rate is compared to a yaw rate setpoint value. In making this comparison, the system deviation of the yaw rate is determined and driver-independent, wheel-individual brake interventions and/or engine interventions are performed as a function of this system deviation. Using this brake intervention, primarily a yaw moment is applied to the vehicle to bring the actual yaw rate closer to the setpoint yaw rate.

The contents of the above-mentioned ATZ article are hereby included in the present application.

The above-described vehicle dynamics control also generally known as ESP (Electronic Stability Program) was initially developed for highway vehicles, but it is now being increasingly used in off-road-capable vehicles. However, undesirable interventions by the vehicle controller with which the yaw rate of the vehicle is to be controlled are disturbing in off-road situations. Thus, one object of the present invention is to modify existing devices for controlling at least one vehicle motion quantity, in particular the yaw rate of the vehicle, so that it can also be used in off-road-capable vehicles.

German Published Patent Application No. 39 33 652 describes an antilock control system and a traction control system suitable for driving on off-road terrain. The antilock control system contains sensors for determining the wheel speeds. A vehicle deceleration is determined from the wheel speeds in an analyzer circuit. Signals of a vehicle deceleration sensor are also processed in the analyzer circuit. The vehicle deceleration determined from the wheel speeds, and the signals of the vehicle deceleration sensor are compared to one another. If the measured vehicle deceleration predominates, the ABS control is modified toward less sensitive braking. A similar procedure is used in the traction control system.

Furthermore, German Published Patent Application No. 195 44 445 describes a method for improving the control response of an antilock control system for off-road vehicles. In order to improve the control response of the antilock control system for off-road vehicles, the control is configured for a vehicle reference velocity that is less than a predefined velocity limit value so that the antilock control for the second wheel of the axle is not initiated until one wheel of an axle is locked. Thus basically only one wheel of an axle is allowed to lock for low velocities. Furthermore, the control can also be configured so that a special control mode is activated when off-road driving and low vehicle velocity are detected.

The devices described in the two above-mentioned documents relate to devices for controlling a quantity describing the wheel behavior, namely the wheel slip. In other words, using these devices the wheel behavior is adjusted according to a control algorithm i.e., the wheel behavior or the vehicle motion is controlled. The control of a vehicle motion quantity which describes a motion of the vehicle, for example, the rotation of the vehicle about its vertical axis is not possible using these devices because the wheel information does not provide indications concerning the vehicle motion and, in addition, these devices do not to detect any quantity through which specific information concerning the vehicle motion can be made available and which is used in the control as a control quantity. In the case of the off-road-capable brake slip controller or traction controller from the related art, the wheel slip has the primary function in the control, i.e., the wheel is stabilized by interventions which originate in the control. The vehicle motion in this case is initially of secondary importance.

On the other hand, in controlling a vehicle motion, the vehicle motion is of primary importance for the control, i.e., the vehicle is stabilized. The behavior of the wheels during this control is initially of secondary importance.

SUMMARY OF THE INVENTION

The device according to the present invention is a device for controlling at least one vehicle motion quantity which describes a motion of a vehicle. The device contains a control arrangement for activating actuators to control the vehicle motion quantity. In addition, the device contains a determining arrangement for determining a poor road stretch quantity which describes the travel of the vehicle on a poor road stretch. The control arrangement is affected as a function of the poor road stretch quantity so that the sensitivity of the control arrangement is adapted to the travel of the vehicle on a poor road stretch.

The control arrangement contained in the device according to the present invention are composed of one higher-level and at least one lower-level controller. According to the present invention, both controllers are affected as a function of the poor road stretch quantity.

The higher-level controller is a controller for controlling a transverse dynamics quantity which describes the transverse dynamics of the vehicle. This controller is used to perform at least driver-independent wheel-individual brake interventions as soon as a deviation quantity which describes the deviation between an actual value and a setpoint value for the transverse dynamics quantity exceeds a control threshold. The transverse dynamics quantity is a quantity which describes the yaw rate of the vehicle. According to the present invention, the control threshold of the higher-level controller is increased as a function of the poor road stretch quantity.

When the vehicle travels on a poor road stretch, i.e. in off-road situations as may be the case in track grooves or on gravel roads, for example, greater deviations between the actual value and the setpoint value of the transverse dynamics quantity may occur without control intervention being necessary. For this reason, the control threshold of the higher-level controller is increased and thus the higher level controller is made less sensitive.

When the vehicle travels on a poor road stretch, driver-independent wheel-individual brake interventions performed to control the at least one vehicle motion quantity are suppressed or reduced in their frequency or intensity compared to the situation where the vehicle travels on a non-poor road stretch by affecting the higher-level controller. Consequently no disturbing intervention occurs when the vehicle travels on a poor road stretch.

The at least one lower-level controller is advantageously a traction controller which is used to adjust the drive slip of the driven wheels according to a setpoint value for the drive slip. According to the present invention, the setpoint value for the drive slip is determined as a function of the poor road stretch quantity. Thus, sufficient traction is guaranteed by this measure when traveling on a poor road stretch.

When the vehicle travels on a poor road stretch, a greater drive torque or a greater drive slip is allowed on the driven wheels compared to the situation where the vehicle travels on a non-poor road stretch by affecting the at least one lower-level controller. When the vehicle travels on a poor road stretch, brake interventions and/or engine interventions performed to reduce the drive slip are suppressed or reduced in their frequency or intensity compared to the situation where the vehicle travels on a non-poor road stretch by affecting the at least one lower-level controller.

Advantageously, the setpoint value for the drive slip is advantageously composed of a first component which represents the desired traction and a second component which represents the required vehicle stability. Using a factor, it is determined which of the two components has a greater weight in the setpoint value for the drive slip. According to the present invention, the first component is increased as a function of the poor road stretch quantity. As an alternative or additionally, the factor is affected as a function of the poor road stretch quantity so that the first component has a greater weight in the setpoint value for the drive slip than the second component.

Advantageously, a quantity which is a measure of the rate at which the engine torque delivered by the engine should be reduced is affected as a function of the poor road stretch quantity.

The poor road stretch quantity is advantageously determined as a function of wheel speed quantities which describe the wheel speeds of the individual wheels and of a velocity quantity which describes the velocity of the vehicle. A wheel oscillation quantity which is a measure of the wheel oscillations occurring when the vehicle travels on a poor road stretch is determined as a function of the wheel speed quantities. The poor road stretch quantity is determined as a function of this wheel oscillation quantity.

The poor road stretch quantity is advantageously a continuous quantity which assumes any desired value between a minimum value and a maximum value. In the case where the poor road stretch quantity assumes the minimum value, the control arrangement is not affected. In the case where the poor road stretch quantity assumes the maximum value, the control arrangement is affected to the maximum possible degree. In the case where the poor road stretch quantity assumes any desired value between the minimum and the maximum value, the control arrangement is continuously affected.

The wheel oscillation quantity is converted into a first continuous quantity which assumes a minimum value when the wheel oscillation quantity is less than a predefined first value and assumes a maximum value when the wheel oscillation quantity is greater than a predefined second value. The first continuous quantity increases continuously between the first and the second value for the wheel oscillation quantity. The velocity quantity is converted into a second continuous quantity which assumes a maximum value when the velocity quantity is less than a predefined first value and assumes a minimum value when the velocity quantity is greater than a predefined second value. The second continuous quantity decreases continuously between the first and the second value for the velocity quantity. The poor road stretch quantity is advantageously determined as the minimum of the first and the second continuous quantities.

The poor road stretch quantity is advantageously only determined when the off-road gear is selected in the case of vehicles equipped with a manual transmission that has a driver-selectable off-road gear.

In summary: the advantage of the device according to the present invention compared to the device described in the above-named ATZ article is that off-road situations, i.e., poor road stretches or travel on rough terrain are recognized and the control arrangement, i.e., the vehicle controller, is set to be less sensitive. Thus, both disturbing brake interventions and loss of traction are avoided. At the same time, the at least one vehicle motion quantity, i.e., the yaw rate of the vehicle, is controlled. In the case of the device described in the above-named ATZ article, disturbing brake interventions and also loss of traction may occur because the vehicle controller cannot be automatically set to be less sensitive in an off-road situation. This results in an uncomfortable driving sensation and is associated with noise. With the device described in the ATZ article, the driver can only press a passive button provided in the dashboard with which the vehicle controller is turned off (and on again) in order to prevent disturbing brake interventions and loss of traction. This, however, has the considerable disadvantage that in critical situations no more support by the controller is available.

DETAILED DESCRIPTION

Figure 1:
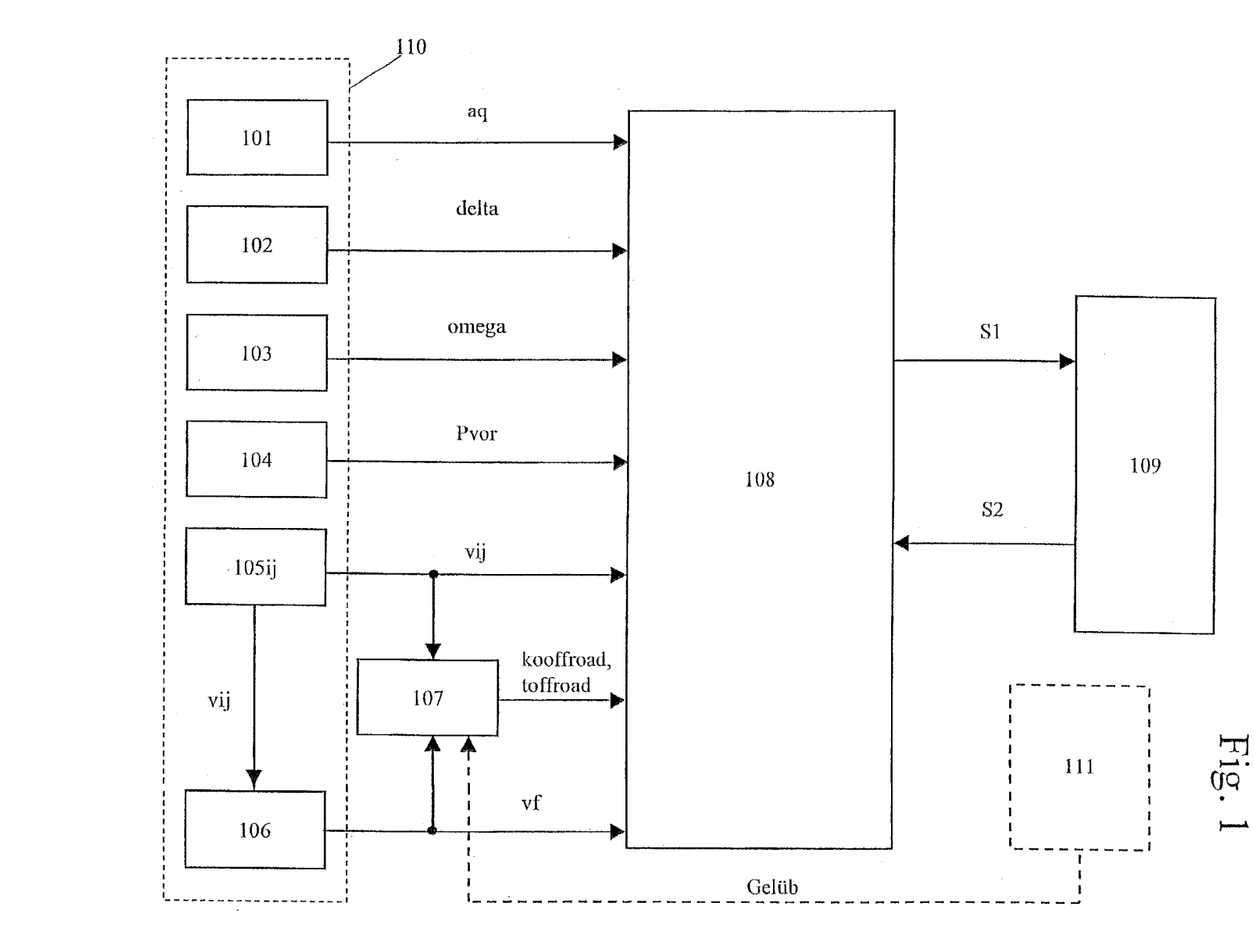
FIG. 1 is a first illustration of the device according to the present invention.

FIG. 1 shows a control arrangement 108 in a general form, such as used, for example, in vehicle dynamics control. Regarding further details, reference is made here to the above-mentioned publication "FDR—Die Fahrdynamikregelung von Bosch" (FDR—vehicle dynamics control by Bosch). The control arrangement receives different input quantities: transverse acceleration aq determined with the help of a transverse acceleration sensor 101, steering angle delta determined with the help of a steering angle sensor 102, yaw rate omega of the vehicle determined with the help of a yaw rate sensor 103, admission pressure Pvor set by the driver and determined with the help of a pressure sensor 104, wheel speeds vij determined with the help of wheel speed sensors 105ij, and a velocity quantity vf which describes the velocity of the vehicle and is determined in a block 106 in a known manner as a function of wheel speeds vij. The abbreviated notation 105ij used above for wheel speed sensors has the following meaning: index i indicates whether it is a front wheel (v) or a rear wheel (h). Index j indicates whether it is a right-hand (r) or a left-hand (l) vehicle wheel. This notation is identical for all quantities and blocks for which it is used.

Sensors 101, 102, 103, 104 and 105ij, as well as block 106 are combined into a block 110. Block 107 represents a determining arrangement with which a poor road stretch quantity kooffroad is determined. This poor road stretch quantity kooffroad is supplied to control arrangement 108 for further processing. Poor road stretch quantity kooffroad is determined in block 107 as a function of wheel speed quantities vij and velocity quantity vf sent there. In order to determine poor road stretch quantity kooffroad, a wheel oscillation quantity toffroad, which is a measure of the wheel oscillations occurring when the vehicle travels on a poor road stretch, is initially determined as a function of wheel speed quantities vij. In order to determine wheel oscillation quantity toffroad, an evaluation is performed to determine whether frequent changes between high and low wheel speeds occur within a few computing cycles, which characterizes a vehicle traveling on a poor road stretch. Wheel oscillation quantity toffroad is also supplied to control arrangement 108.

Figure 3A:
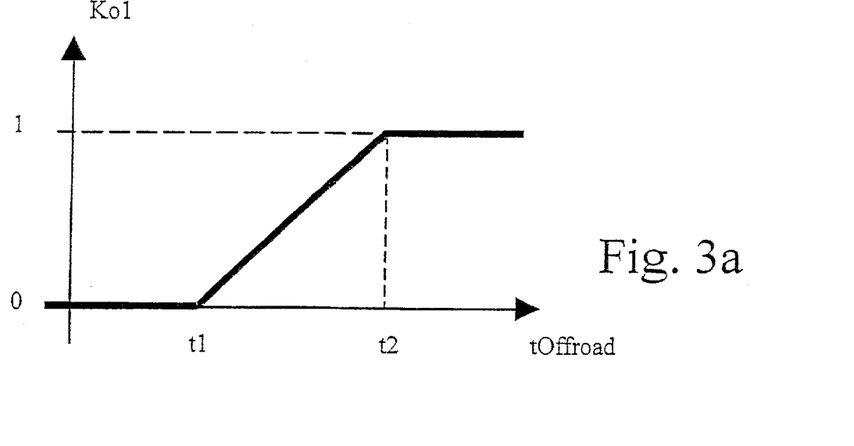
FIG. 3a shows a first value used in the device according to the present invention.
Figure 3B:
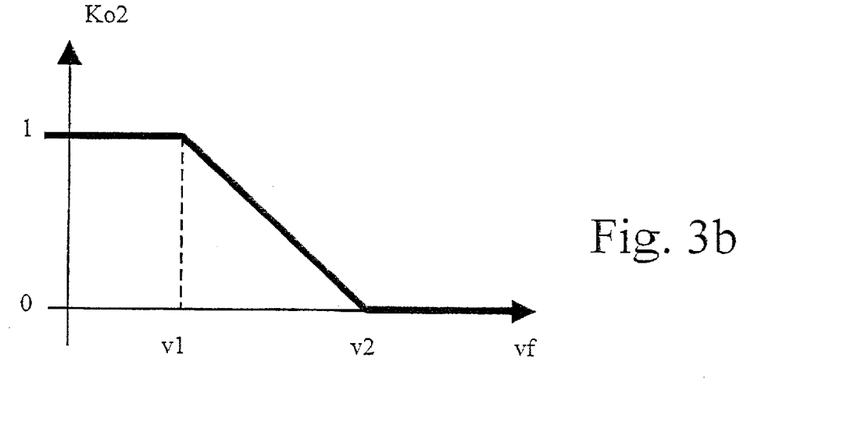
FIG. 3b shows a second value used in the device according to the present invention.

Poor road stretch quantity kooffroad is determined in block 107 as described with the help of FIGS. 3a and 3b. Wheel oscillation quantity toffroad is converted to a first continuous quantity Ko1. This is illustrated in FIG. 3a. Continuous quantity Ko1 assumes a minimum value when the wheel oscillation quantity is less than a first predefined value t1. According to FIG. 3a, this is the value 0. When the wheel oscillation quantity is greater than a predefined second value t2, continuous quantity Ko1 assumes a maximum value. According to FIG. 3a, this maximum value is 1. Between the predefined first value and the predefined second value of the wheel oscillation quantity, first continuous quantity Ko1 increases or decreases linearly. The variation of the first continuous quantity Ko1 as illustrated in FIG. 3a guarantees the following: a wheel oscillation quantity toffroad is a measure of the wheel oscillations occurring when the vehicle travels on a poor road stretch. The greater the wheel oscillations caused by the poor road stretch, the greater the value of wheel oscillation quantity toffroad. Very slight wheel oscillations represented by values of wheel oscillation quantity toffroad that are less than t1 are considered uncritical and therefore should not result in the control arrangement being affected. Therefore the value 0 is assigned to first continuous quantity Ko1 in this situation, i.e., wheel oscillation quantity toffroad is suppressed. If wheel oscillations characterized by values of wheel oscillation quantity toffroad greater than t2 occur, these wheel oscillations are considered critical, resulting in the maximum possible effect on the control arrangement. In this case, the value 1 is assigned to the first continuous quantity. When wheel oscillations characterized by a value of wheel oscillation quantity toffroad between first value t1 and second value t2 occur, the control arrangement should be affected continuously. For this reason, a continuous value is assigned to the first continuous quantity.

Velocity value vf is converted into a second continuous quantity Ko2. This is illustrated in FIG. 3b. If values that are less than a predefined first value v1 for the velocity quantity are present for velocity quantity vf, the second continuous quantity assumes a maximum value. According to FIG. 3b, this is the value 1. However, if values that are greater than a predefined second value v2 for the velocity quantity are present for velocity quantity vf, second continuous quantity Ko2 assumes a minimum value. According to FIG. 3b, this is the value 0. If velocity quantity vf assumes values that are between value v1 and v2, the second continuous quantity decreases continuously, i.e., it decreases linearly from the maximum value to the minimum value. For the second continuous quantity, the characteristic illustrated in FIG. 3b has been selected for the following reason: in a velocity range described by velocity 0 and velocity v1, brake interventions of the vehicle controller caused by the vehicle traveling on a poor road stretch have a disturbing effect. Therefore, the maximum value is assigned to the second continuous quantity for this velocity range. Value v1 corresponds to a vehicle velocity of 20 to 30 km/h depending on the vehicle type. Above a velocity v2, it is assumed that the vehicle is not traveling on a poor road stretch. For this reason, the vehicle controller is allowed to affect the brakes above velocity v2. Thus, the minimum value is assigned to second continuous quantity Ko2 above the value v2.

Poor road stretch quantity kooffroad is obtained as the minimum of the first and the second continuous quantity. Therefore, poor road stretch quantity kooffroad is also a continuous quantity which assumes any desired value between a minimum and a maximum value. Due to the way in which poor road stretch quantity kooffroad is determined, the minimum value is the value 0 and the maximum value is the value 1. The following shall apply to the assignment of values to poor road stretch quantity kooffroad for affecting the control arrangement: in the case where the poor road stretch quantity assumes the minimum value, no effect on the control arrangement should occur. This is the case where wheel speed quantity toffroad is less than value t1 or where velocity quantity vf is greater than value v2. In the case where poor road stretch quantity kooffroad assumes the maximum value, the control arrangement should be affected to the maximum possible degree. This is the case when wheel oscillation quantity toffroad is greater than value t2 or when velocity quantity vf is less than value v1. In the case where poor road stretch quantity kooffroad assumes any value between the minimum and the maximum value, the control arrangement should be affected continuously. The effect on the control arrangement will be described in more detail with reference to FIG. 2.

FIG. 1 contains a block 111 illustrated with dashed lines. This block 111 is a switching arrangement which may or may not be present depending on the type of manual transmission used in the vehicle. In the case of a vehicle equipped with a manual transmission having a driver-selectable off-road gear, block 111 is present. If, however, the manual transmission does not have an off-road gear, switching arrangement 111 is not present. Block 107 receives the information on whether or not the driver has selected the off-road gear through a signal Gelüb generated by block 111. On the basis of signal Gelüb supplied to block 107, the determination of poor road stretch quantity kooffroad in block 107 can be modified as follows: if the driver has selected the off-road gear, it is assumed that the vehicle is traveling on a poor road stretch, i.e., off-road. Therefore, in this situation it must be ensured that the control arrangement are affected according to the present invention, i.e., poor road stretch quantity kooffroad must be determined in block 107. However, if block 107 is informed that the driver has not selected the off-road gear, it is assumed that the vehicle is not traveling on a poor road stretch, i.e., it is not off-road. Consequently, the control arrangement does not need to be affected according to the present invention, i.e., poor road stretch quantity kooffroad is not to be determined in block 107. Due to the fact that poor road stretch quantity kooffroad is only determined, i.e., made available, if the driver has selected the off-road gear, no unneeded computer capacity, i.e., computer power is tied up.

Based on input quantities aq, delta, omega, Pvor, vij, and vf supplied to control arrangement 108, the control arrangement generate activation signals S1, according to the control software stored in the arrangement, for actuators 109 assigned to them. The actuators correspond to an arrangement for affecting the torque delivered by the engine and/or the brakes assigned to the vehicle's wheels, for example, the brakes being part of a hydraulic, electrohydraulic, pneumatic, electropneumatic, or electromechanical brake system. Signals S2 are supplied from actuators 109 to the control arrangement; these signals provide the control arrangement with information about the operating state of the actuators. Regarding the control software stored in control arrangement 108, reference is made to the above-mentioned publication "FDR—Die Fahrdynamikregelung von Bosch" (FDR—vehicle dynamics control by Bosch). This control software and thus also control arrangement 108 are affected by quantities kooffroad and/or toffroad supplied from block 107 to control arrangement 108.

Figure 2:
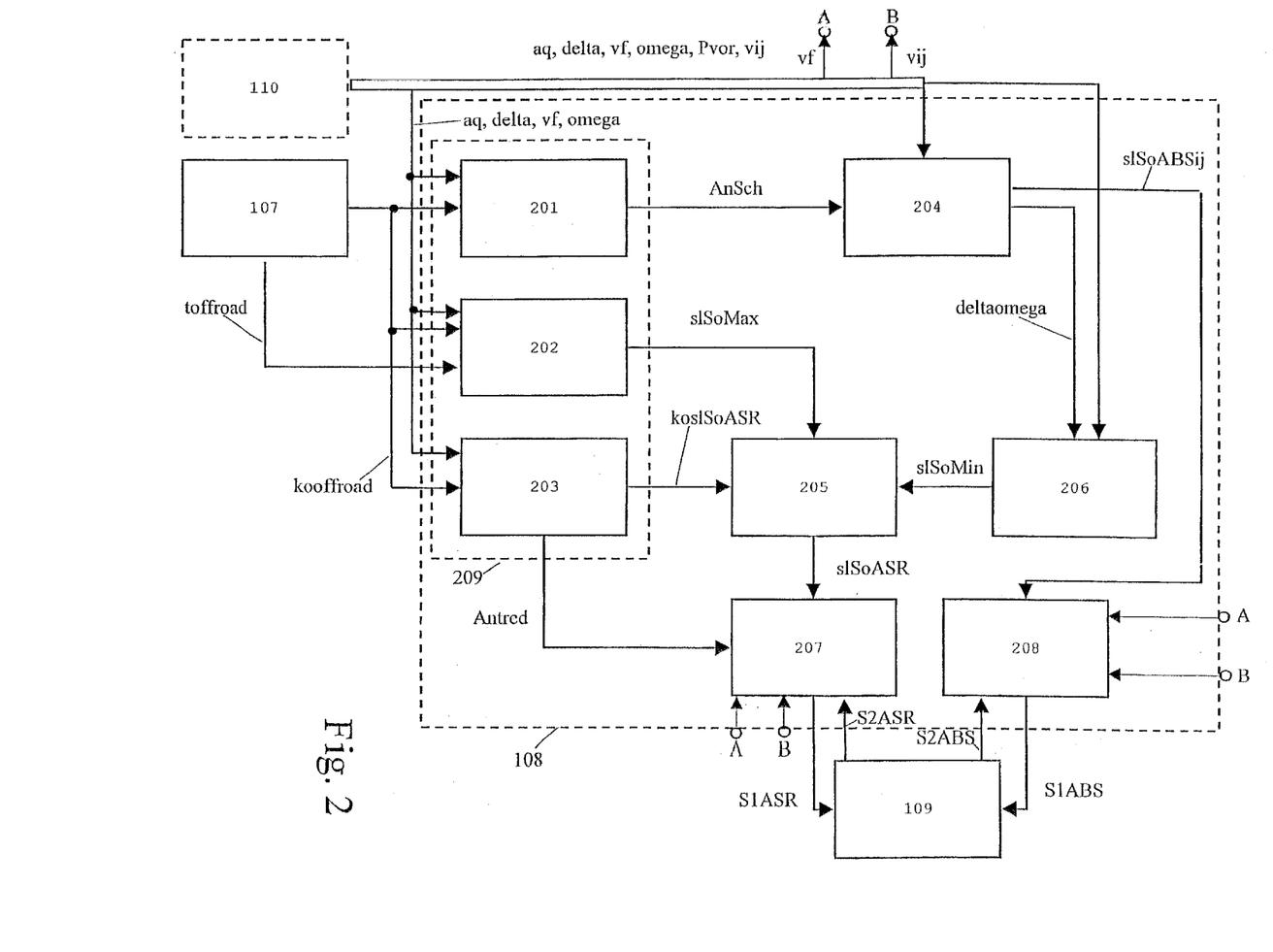
FIG. 2 is a second illustration of the device according to the present invention.

In the following FIG. 2 is explained. FIG. 2 shows block 110 which provides quantities aq, delta, vf, omega, Pvor and vij that have been detected or determined. All the above-named quantities are supplied to both block 204 and block 206. Quantities aq, delta, vf and omega are supplied to blocks 201, 202 as well as 203. Quantities vij and vf are supplied to both block 207 and to block 208.

Poor road stretch quantity kooffroad is supplied from determining arrangement 107 to blocks 201, 202, and 203 for processing. In addition, wheel oscillation quantity toffroad is supplied from determining arrangement 107 to block 202. Blocks 201, 202, and 203 from which the control arrangement is affected are combined to form block 209.

Block 204 represents a higher-level controller with which a transverse dynamics quantity which describes the transverse dynamics of the vehicle is controlled. In the present embodiment the transverse dynamics quantity is yaw rate omega of the vehicle. In order to control the transverse dynamics quantity, a deviation quantity is determined. In the present embodiment this is the deviation between actual value omega and a setpoint value for the yaw rate of the vehicle. The setpoint value for the yaw rate is determined block 204 from velocity quantity vf and steering angle delta with the help of the Ackermann equation. As soon as the deviation quantity exceeds a control threshold, quantities slSoABSij are determined in block 204 and supplied to block 208. Quantities slSoABSij are the setpoint values of the brake slip of the individual wheels which are to be set using lower-level brake slip controller 208. Setting setpoint brake slip slSoABSij results in driver-independent wheel-individual brake interventions on the individual wheels. Due to these driver-independent wheel-individual brake interventions, measured yaw rate omega becomes closer to the setpoint value of the yaw rate. In addition, block 204 delivers a quantity deltaomega which describes the deviation between measured yaw rate omega and the setpoint value for the yaw rate. Normally, quantity deltaomega is the above-described deviation quantity. However, it is also conceivable that quantity deltaomega is determined in some other manner. Quantity deltaomega is supplied from block 204 to block 206.

The setpoint value for the yaw rate is limited to physically plausible values as a function of the transverse acceleration supplied to block 204. Quantities Pvor and vij are needed in connection with determining the setpoint values slSoABSij for the brake slip controller.

Control threshold AnSch which is needed in block 204 is determined in block 201 and then supplied to block 204. Control threshold AnSch is determined in block 201 according to the following equation, for example:

$$AnSch(\text{new}) = AnSch(\text{old}) + P\_OffrUnempf * kooffroad \qquad (1)$$

The quantities used in the above equation have the following meaning: quantity AnSch(old) is the control threshold determined for normal operation of the vehicle, i.e., for the vehicle traveling on a non-poor road stretch. Quantity AnSch(old) is determined as a function of quantities aq, delta, vf and omega supplied to block 201. Quantity P_OffrUnempf is a parameter determined in advance by test drives. As can be seen from the above equation, control threshold AnSch(new) used when the vehicle travels on a poor road stretch is composed of a first and a second summand. The first summand corresponds to the control threshold which is used for normal operation of the vehicle. The second summand represents a correction of the control threshold made due to the vehicle traveling on a poor road stretch. The greater the second summand, the more insensitive is the higher-level controller. If poor road stretch quantity kooffroad assumes the value 0, which is equivalent to no travel on a poor road stretch, the control threshold is not increased. However, if poor road stretch quantity kooffroad assumes the value 1, which is equivalent to the vehicle traveling on an extremely poor road stretch, the control threshold increases to the maximum possible value. For a value of the poor road stretch quantity between 0 and 1, the control threshold increases continuously.

Driver-independent wheel-individual brake interventions are not carried out unless a deviation quantity which describes the deviation between an actual value and a setpoint value of the yaw rate exceeds the control threshold; therefore, an increase in the control threshold means that the higher-level controller is made less sensitive because these driver-independent wheel-individual brake interventions are not performed in this case unless there is a major deviation between the actual yaw rate and the setpoint yaw rate. When the vehicle travels on a poor road stretch, the driver-independent wheel-individual brake interventions performed to control the yaw rate are suppressed or reduced in their frequency or intensity, compared to the situation where the vehicle travels on a non-poor road stretch which is based on control threshold AnSch(old), by affecting the higher-level controller, i.e. by increasing the control threshold.

It should be emphasized here again: if the vehicle is traveling on a non-poor road stretch, the value of poor road stretch quantity kooffroad is ideally 0 for this situation. Based on equation (1), this means that control threshold AnSch(old) is used as the control threshold. However, if the vehicle is traveling on a poor road stretch, in this situation the value of poor road stretch quantity kooffroad is different from 0. Taking into consideration equation (1), the control threshold is increased from the value AnSch(old) in this case A quantity slSoMax used for determining setpoint value slSoASR for the drive slip is determined in block 202. Quantity slSoMax represents the component of setpoint value slSoASR which describes the desired traction to be set. Quantity slSoMax is determined according to the following equation, for example:

$$slSoMax(\text{new})=(1+P\_slSoAnhmult*kooffroad)*(slSoMax(\text{old})+slSoAdd) \qquad (2).$$

Quantity slSoMax, which is also referred to as traction slip, is composed of a multiplicative component, the first parenthesis, and an additive component, the second parenthesis. The multiplicative component, which can be set via parameter P_slSoAnhmult, is to be effective only in the lower velocity range. For this reason, this component contains poor road stretch quantity kooffroad as a multiplier. Parameter P_slSonAnhmult is determined in advance by test drives. It assumes values between 0.5 and 3 and/or 4. Additive component slSoAdd is to be effective over the entire velocity range. Therefore, the additive component only depends on wheel oscillation quantity toffroad and not on the velocity quantity. Additive component slSoAdd is determined as illustrated in FIG. 3c as a function of wheel oscillation quantity toffroad.

At this point it should be emphasized again: if the vehicle is traveling on a non-poor road stretch, the value of poor road stretch quantity kooffroad is ideally 0 for this situation. On the basis of equation (2), this means that the quantity slSoMax is composed only as a sum of slSoMax(old), the traction slip for travel on a non-poor road stretch, and slSoAdd. However, if the vehicle is traveling on a poor road stretch, in this situation the value of poor road stretch quantity kooffroad is different from 0. As can be seen from equation (2), in this case the value of quantity slSoMax is increased.

Figure 3C:
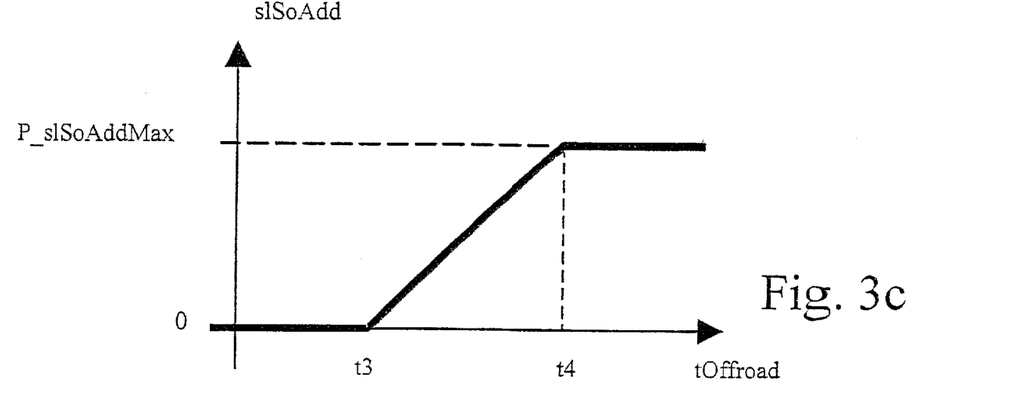
FIG. 3c shows a third value used in the device according to the present invention.

The maximum additive component P_slSoAddMax contained in FIG. 3c is determined in advance by test drives. Additive component slSoAdd itself assumes a minimum value for values of wheel oscillation quantity toffroad that are less than a first predefined value t3. According to FIG. 3c, this is the value 0. For values of wheel oscillation quantity toffroad that are greater than a second predefined value t4, additive component slSoAdd assumes a maximum value. According to FIG. 3c, the maximum value is quantity P_slSoAddMax.

Additive component slSoAdd increases continuously between value t3 and value t4 of wheel oscillation quantity toffroad.

Value slSoMax(old) corresponds to the traction slip which is used for the vehicle traveling on a non-poor road stretch. This value is determined in block 202 as a function of quantities aq, delta, vf and omega. Traction slip slSoMax is supplied from block 202 to a block 205.

Two quantities are determined in block 203. These are quantity KoslSoASR, which is determined according to the following equation, for example:

$$KoslSoASR(\text{new})=(1-(1-P\_mult)*kooffroad)*(KoslSoASR(\text{old})-P\_add*kooffroad) \qquad (3).$$

The two quantities P_mult and P_add can be freely selected between 0 and 1 and are determined in advance by test drives. Quantity P_add represents a response threshold for factor KoslSoASR. Parameter P_mult represents the maximum attenuation. Quantity KoslSoASR(old) which corresponds to the value of the factor which is used for the vehicle traveling on a non-poor road stretch is determined in block 203 as a function of quantities aq, delta, vf and omega. Factor KoslSoASR is supplied from block 203 to block 205.

At this point it should be emphasized again: If the vehicle is traveling on a non-poor road stretch, the value of poor road stretch quantity kooffroad is ideally 0 for this situation. On the basis of equation (3), this means that the quantity KoslSoASR(old) is used as quantity KoslSoASR. However, if the vehicle is traveling on a poor road stretch, in this situation the value of poor road stretch quantity kooffroad is different from 0. Taking into consideration equation (3), quantity KoslSoASR is reduced in this case.

A quantity Antred is determined in block 203. This quantity is a measure of the rate at which the engine torque delivered by the engine is reduced. Quantity Antred is determined using the following equation, for example:

$$Antred(\text{new})=(1-(1-P\_mult')*kooffroad)*(Antred(\text{old})-P\_add'*kooffroad) \qquad (4).$$

This equation has the same structure as equation (3). Therefore the same statements made for equation (3) apply to equation (4). Quantity Antred is supplied from block 203 to block 207.

In block 206, a quantity slSoMin, corresponding to the drive slip allowed for ensuring the vehicle's stability, is determined. Quantity slSoMin is determined as a function of whether the vehicle is being understeered or oversteered. If the vehicle is being understeered, quantity slSoMin corresponds to a brake slip. If the vehicle is being oversteered, quantity slSoMin corresponds to a drive slip. Essentially, quantity slSoMin is determined as a function of quantity deltaomega which describes the difference between the actual value for the yaw rate and the setpoint value for the yaw rate and thus contains information regarding the vehicle being understeered or oversteered. The remaining quantities supplied to block 206 are also used for determining quantity slSoMin. Quantity slSoMin is supplied from block 206 to block 205.

Setpoint value slSoASR for the drive slip is determined in block 205. This is accomplished according to the following equation, for example:

$$slSoASR = slSoMax + KoslSoASR*(slSoMin - slSoMax) \quad (5).$$

Equation (5) contains two components: a first component slSoMax, which represents the desired traction, and a second component slSoMin, which represents the required vehicle stability. With the help of factor KoslSoASR it is determined which of the two components has a greater weight in the setpoint value for the drive slip. First component slSoMax is by definition greater than second component slSoMin. Thus, with the help of first component slSoMax it is ensured that sufficient drive slip is available in the case of forward drive. The second component ensures with a view to the vehicle stability that the forward drive slip is appropriately small and thus sufficient lateral traction is available.

When setpoint value slSoASR for the drive slip is determined, the system switches between first component slSoMax and second component slSoMin with the help of factor KoslSoASR depending on whether the intent of the driver is to increase the traction or to increase stability in the given driving situation.

Setpoint value slSoASR for the drive slip is supplied from block 205 to block 207. In block 207 this setpoint value is converted into appropriate control signals S1ASR for the engine and for the brakes assigned to the driven wheels. These control signals S1ASR are supplied from block 207 to actuators 109. Block 207, which is the lower-level traction controller, receives feedback signals S2ASR from actuators 109.

The following can be stated regarding the lower-level traction controller: If an off-road situation is detected, i.e., if the vehicle is traveling on a poor road stretch, traction slip component slSoMax is increased. Factor KoslSoASR, which represents a stability factor, is reduced. Quantity Antred is also reduced. These measures cause the required slip to increase and at the same time the detection system is made less sensitive to vehicle stability.

Block 208, which is a lower-level brake slip controller, converts setpoint values slSoABSij for the brake slip supplied to it into appropriate control signals S1ABS for the brakes assigned to the individual wheels. Block 208 receives feedback signals S2ABS from actuators 109.

It should be noted here that quantities S1ASR and/or S1ABS contained in FIG. 2 are combined to give quantities S1 in FIG. 1. The same applies to quantities S2ASR and S2ABS contained in FIG. 2 and quantity S2 in FIG. 1.

It should be pointed out here again that the increase in the control threshold for the higher-level controller and measures carried out for the lower-level controller, i.e., the increase in traction slip slSoMax, the reduction in factor KoslSoASR, and the reduction in quantity Antred overall result in the sensitivity of the control arrangement being adapted to the vehicle's travel on a poor road stretch.

In conclusion, it should be noted that the form of the embodiment selected in the description and the representation selected in the figures should have no limiting effect on the idea essential to the present invention. Thus, the yaw rate, the transverse acceleration can also be used for the transverse dynamics quantity.

What is claimed is:

1. A device for controlling at least one vehicle motion quantity describing a motion of a vehicle, comprising:
    a control arrangement for activating actuators to control the at least one vehicle motion quantity; and
    a determining arrangement for determining a poor road stretch quantity describing a travel of the vehicle on a poor road stretch, wherein:
    the control arrangement is affected as a function of the poor road stretch quantity so that a sensitivity of the control arrangement is adapted to the travel of the vehicle on the poor road stretch.

2. The device according to claim 1, wherein:
    the control arrangement includes a higher-level controller and a lower-level controller, each one of the higher-level controller and the lower-level controller being affected as a function of the poor road stretch quantity.

3. The device according to claim 2, wherein:
    when the vehicle travels on the poor road stretch, driver-independent wheel-individual brake interventions performed to control the at least one vehicle motion quantity are one of suppressed and reduced in one of a frequency and an intensity compared to when the vehicle travels on a non-poor road stretch by affecting the higher-level controller.

4. The device according to claim 2, wherein when the vehicle travels on the poor road stretch, at least one of the following occurs:
    one of a greater drive torque and a greater drive slip is allowed on driven wheels compared to when the vehicle travels on a non-poor road stretch by affecting the lower-level controller, and
    at least one of brake interventions and engine interventions performed to reduce the drive slip are one of suppressed and reduced in one of a frequency and an intensity compared to when the vehicle travels on a non-poor road stretch by affecting the lower-level controller.

5. The device according to claim 2, wherein:
    the higher-level controller controls a transverse dynamics quantity that describes transverse dynamics of the vehicle,
    the higher-level controller performs at least driver-independent wheel-individual brake interventions as soon as a deviation quantity describing a deviation between an actual value and a setpoint value for the transverse dynamics quantity exceeds a control threshold, and
    the control threshold of the higher-level controller is increased as a function of the poor road stretch quantity, the transverse dynamics quantity describing a yaw rate of the vehicle.

6. The device according to claim 2, wherein:

the lower-level controller includes a traction controller for adjusting a drive slip of driven wheels according to a setpoint value for the drive slip, the setpoint value for the drive slip being determined as a function of the poor road stretch quantity.

7. The device according to claim 6, wherein:

the setpoint value for the drive slip includes a first component that represents a desired traction and a second component that represents a required vehicle stability, a factor is used to determine which of the first component and the second component has a greater weight in the setpoint value for the drive slip, and at least one of the following occurs:
   the first component is increased as a function of the poor road stretch quantity, and
   the factor is affected as a function of the poor road stretch quantity so that the first component has the greater weight in the setpoint value for the drive slip.

8. The device according to claim 6, wherein:

a quantity corresponding to a measure of a rate at which an engine torque delivered by an engine is reduced is affected as a function of the poor road stretch quantity.

9. The device according to claim 1, wherein:

the poor road stretch quantity is determined as a function of wheel speed quantities describing speeds of individual wheels and of a velocity quantity describing a velocity of the vehicle.

10. The device according to claim 9, wherein:

a wheel oscillation quantity corresponding to a measure of wheel oscillations occurring when the vehicle travels on the poor road stretch is determined as a function of the wheel speed quantities, and the poor road stretch quantity is determined as a function of the wheel oscillation quantity.

11. The device according to claim 1, wherein:

the poor road stretch quantity is a continuous quantity that assumes any desired values between a minimum value and a maximum value, and at least one of the following occurs:
   the control arrangement is not affected when the poor road stretch quantity assumes the minimum value,
   when the poor road stretch quantity assumes the maximum value, the control arrangement is affected to a maximum possible degree, and
   when the poor road stretch quantity assumes any desired value between the minimum value and the maximum value, the control arrangement is continuously affected.

12. The device according to claim 11, wherein:

the minimum value is 0, and the maximum value is 1.

13. The device according to claim 11, wherein:

a wheel oscillation quantity is converted into a first continuous quantity that assumes a minimum value when the wheel oscillation quantity is less than a predefined first value and that assumes a maximum value when the wheel oscillation quantity is greater than a predefined second value, the first continuous quantity increases continuously between a first value and a second value for the wheel oscillation quantity, a velocity quantity is converted into a second continuous quantity that assumes the maximum value when the velocity quantity is less than the predefined first value and assumes the minimum value when the velocity quantity is greater than the predefined second value, the second continuous quantity decreases continuously between the predefined first value and the predefined second value for the velocity quantity, and the poor road stretch quantity is determined as a minimum of the first continuous quantity and the second continuous quantity.

14. The device according to claim 13, wherein:

the minimum value is 0, and the maximum value is 1.

15. The device according to claim 1, wherein:

the vehicle includes a manual transmission that has a driver-selectable off-road gear, and the poor road stretch quantity is only determined when the off-road gear is selected.

16. A method for controlling at least one vehicle motion quantity that describes a motion of a vehicle including a control arrangement for activating actuators to control the vehicle motion quantity, comprising the steps of:

determining a poor road stretch quantity that describes a travel of the vehicle on a poor road stretch; and affecting the control arrangement as a function of the poor road stretch quantity so that a sensitivity of the control arrangement is adapted to the travel of the vehicle on the poor road stretch.

* * * * *